(No Model.)

G. E. CATES & D. REUSCHENBERG.
CAR FENDER.

No. 511,586. Patented Dec. 26, 1893.

WITNESSES:
H. Walker
C. Sedgwick

INVENTORS:
G. E. Cates and
D. Reuschenberg
BY Munn & Co.
ATTORNEYS.

UNITED STATES PATENT OFFICE.

GEORGE E. CATES AND DIEDERRECH REUSCHENBERG, OF BROOKLYN, NEW YORK.

CAR-FENDER.

SPECIFICATION forming part of Letters Patent No. 511,586, dated December 26, 1893.

Application filed August 17, 1893. Serial No. 483,421. (No model.)

*To all whom it may concern:*

Be it known that we, GEORGE E. CATES and DIEDERRECH REUSCHENBERG, of Brooklyn, in the county of Kings and State of New York, have invented a new and Improved Car-Fender, of which the following is a full, clear, and exact description.

Our invention is an improvement in the class of car fenders which are pivoted to the cars and held normally elevated but adapted to be depressed by tension on the brake chain.

The invention consists in the novel construction and combination of the several parts, as will be hereinafter fully set forth and pointed out in the claim:

Reference is to be had to the accompanying drawings, forming a part of this specification, in which similar figures and letters of reference indicate corresponding parts in all the views.

Figure 1:
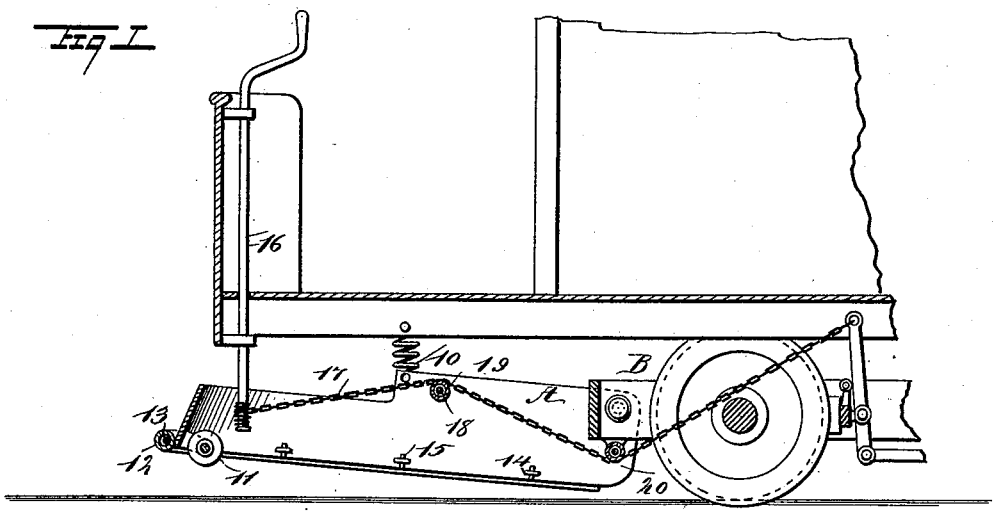
Figure 2:
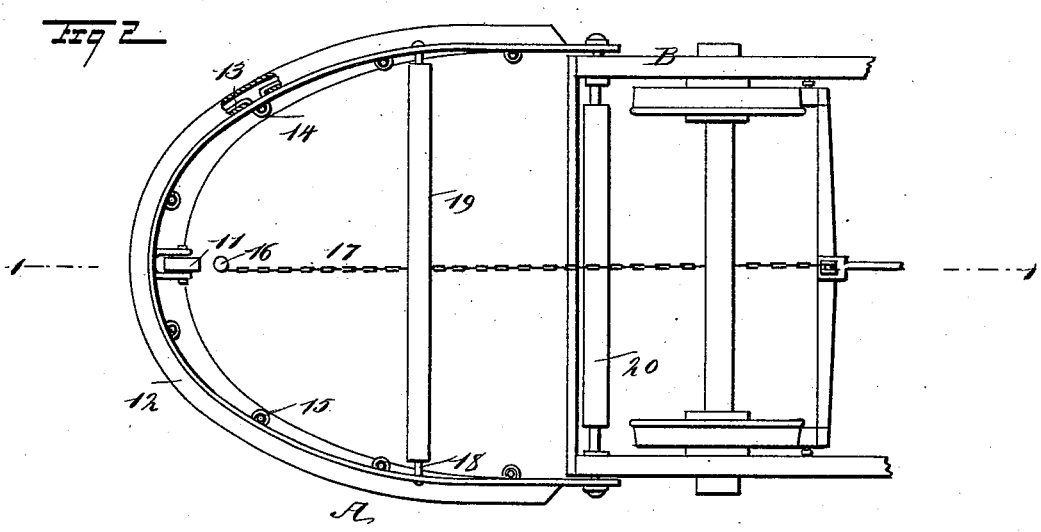
Figure 3:
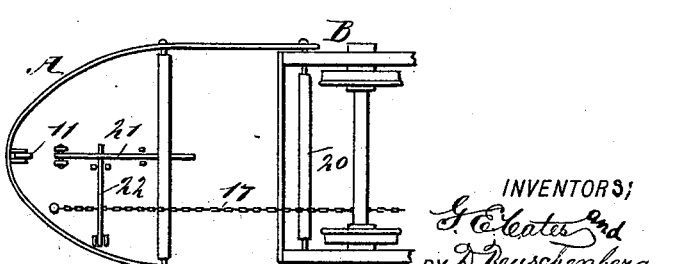

Figure 1 is a partial longitudinal section through a car, illustrating the application of the improved fender thereto, the fender being likewise in longitudinal section, and said sections are taken practically on line 1—1 of Fig. 2. Fig. 2 is a bottom plan view of the front portion of a car and a fender applied to the car, a portion of the cushion being broken away; and Fig. 3 is a bottom plan view of a portion of a car and fender, illustrating a slight modification in the manner of operating the latter.

The fender A may be constructed of any suitable or approved material, as for example it may be made of sheet metal, or of a perforated or reticulated material, but in every instance it is made as light as possible consistent with strength. In its general contour the fender is made practically to correspond to the horizontal outline of the front portion of the car to which it is to be applied. Ordinarily the fender is somewhat of a horseshoe shape, as shown in Fig. 2, and it is adapted to extend around the sides and front of the car from a point at or near the front wheels. Vertically the fender is made to flare somewhat outwardly from its top in direction of its bottom.

The fender is pivotally attached at its rear end to any approved support beneath the car. Preferably, however, the rear ends of the fender are pivotally connected with the outer end portions of the trucks B of the car, one fender being attached to each truck, as a fender is to be located at each end of the car. The fender is supported intermediate of its front and rear portions through the medium of springs 10, of any approved design, a coiled spring being illustrated in the drawings, and the springs are secured in any approved manner to the fender, one or more near the central portion at each side. The said springs are furthermore attached securely to any support conveniently located at the bottom of the car, usually to a floor beam of the platform.

In order that the fender may be carried upward to the greatest possible height it is generally made of less width at the front than at the rear, as shown in Fig. 2; and at the front portion of the fender, ordinarily at or near the center a wheel 11, is located, the wheel being upon the inner portion of the fender, and the lower portion of the wheel is below the lower edge of the front of the fender, as shown in Fig. 1, in order that when the fender is lowered in close proximity to the ground the wheel 11, will strike the surface between the rails over which the car is traveling, and thereby support the forward end of the fender and prevent its lower edge contacting with the ground, thus preserving the fender from wear.

The fender is surrounded upon its outer face near its bottom edge by an elastic cushion 12. The cushion is preferably made of rubber, and is hollow, being in the nature of a tubing, and usually the cushion is attached to the fender, by running through the interior of the cushion a wire rod 13, of suitable thickness, which rod is provided with loops 14 at intervals in its length, said loops being passed through apertures or openings made in the fender, and pins 15, or their equivalents are passed through the inwardly projecting portions of the loops. Instead of pins, however, bolts may be employed.

It is the object of this invention to operate the fender, that is, to lower it, whenever the brakes are applied, thus enabling the motor man or driver of a car to bring the fender close to the ground simultaneously with applying the brakes, the fender acting automatically to raise itself when the brakes are taken off. When the brake lever 16, is located at about the central portion of the platform, the brake chain 17, connected with the lever is made to extend over a cross bar 18, connecting the sides of the fender near its rear, the bar being usually located near the upper edge of the fender, and to prevent friction the bar 18, is provided with a loosely fitting sleeve 19, over which the chain passes.

Thus it is evident that in operation, when the brake is applied, the brake chain as it is wound upon the brake lever, will be drawn downward, and by exerting downward tension upon the sleeve 19, will force the fender close down to the ground, placing the springs 10 under tension. This action is brought about by carrying the brake chain 17, after it has passed over the sleeve 19 on the connecting rod 18, over a friction roller or pulley 20, located upon a support, for example the truck B, below the upper surface of the friction roller and sleeve 19 of the fender, as shown in Fig. 1.

When the brake lever is located at one side of the car, as shown in Fig. 3, a longitudinal arm 21 is pivoted to the forward central portion of the under face of the platform, and the said arm 21, extends over and has bearing upon the sleeve 19 of the fender. A second transverse arm 22, is pivoted near one side of the car beneath the platform, the free end of the arm 22, being made to rest upon the arm 21, and the brake chain 17, is made to pass over the arm 22, and when that arm is pressed downward it will bear down the arm 21, and that arm in turn will press upon the friction roller 19 of the fender and cause the fender to be lowered. It is evident that the moment the brake is released and the brake chain slackened the springs 10 will act to carry the fender to its upper or normal position, which is shown in Fig. 1.

Having thus described our invention, we claim as new and desire to secure by Letters Patent—

In a tram car, the combination, with the car, the brake lever, and the brake-applying mechanism, of a semicircular fender pivotally connected at its rear end to a fixed support beneath the car, springs connecting the fender with the car in advance of its pivotal connection, a bearing, 19, located upon the fender in advance of its pivot, and a bearing on the truck which is located lower than the fender bearing, the brake chain, extending rearward over such fender bearing and under the truck bearing, as shown and described to operate as specified.

GEORGE E. CATES.
DIEDERRECH REUSCHENBERG.

Witnesses:
E. M. CLARK,
F. W. HANAFORD.